United States Patent [19]

Okahashi et al.

[11] Patent Number: 4,785,853
[45] Date of Patent: Nov. 22, 1988

[54] CONDUCT PIPE COVERED WITH ELECTRICALLY INSULATING MATERIAL

[75] Inventors: Kazuo Okahashi; Ichiro Takahashi, both of Osaka, Japan

[73] Assignee: Mitsubishi Denki Kabushiki Kaisha, Tokyo, Japan

[21] Appl. No.: 591,894

[22] Filed: Mar. 21, 1984

Related U.S. Application Data

[63] Continuation of Ser. No. 427,378, Sep. 29, 1982.

[30] Foreign Application Priority Data

Oct. 12, 1981 [JP] Japan ................... 56-162244

[51] Int. Cl.$^4$ ............................................. F16L 9/02
[52] U.S. Cl. ................................. 138/109; 166/248
[58] Field of Search .......... 138/145, DIG. 3, DIG. 6, 138/DIG. 7, 109; 166/248, 302; 174/110 E, 110 FC, 110 SR; 528/125

[56] References Cited

U.S. PATENT DOCUMENTS

| | | | |
|---|---|---|---|
| 2,646,822 | 7/1953 | Ferguson | 138/145 X |
| 3,956,240 | 5/1976 | Dahl et al. | 528/125 |
| 4,157,287 | 6/1979 | Christenson | 166/248 |
| 4,303,128 | 12/1981 | Marr, Jr. | 166/302 |

*Primary Examiner*—Mark J. Thronson
*Attorney, Agent, or Firm*—Sughrue, Mion, Zinn, Macpeak, and Seas

[57] ABSTRACT

A conduct pipe produced by the process of:
producing a metal conduct pipe; and
attaching a powdery, tubular or filmy polyether ether ketone resin to the outside surface of the metal conduct pipe by means of pressure with fusing at a temperature of 350°–400° C. is disclosed. The conduct pipe is particularly useful in an electrode apparatus for collecting underground hydrocarbon resources by an electrically heating method.

1 Claim, 1 Drawing Sheet

CONDUCT PIPE COVERED WITH ELECTRICALLY INSULATING MATERIAL

This application is a continuation, of application Ser. No. 427,378, filed 9/29/82.

FIELD OF THE INVENTION

The present invention relates to a conduct pipe covered with an electrically insulating material and particularly, to a conduct pipe covered with an electrically insulating material useful in an electrode apparatus for collecting underground hydrocarbon resources by an electrically heating method.

In this specification, the term: underground hydrocarbon resources means bitumen contained in oil sand or tar sand, which is called hereinafter "oil" unless otherwise stated.

BACKGROUND OF THE INVENTION

Recently, due to the increase in prices of petroleum recources, studies have been out on collecting oils from oil sand layers buried under the ground in areas such as Canada and Venezuela. The oil sand is generally present as a layer about 50 m thick and is underground at a depth of several hundred meters. However, oils in the oil sand can not be collected and extracted at a normal temperature due to their high viscosity. Therefore, at the present time, methods of extracting oils comprise raising the temperature of oils by injecting heated steam into the oil sand layer to reduce the viscosity of oils. However, such a method is not efficient due to the increase in cost. Accordingly, studies have been carried out to provide a method of collecting oils with high productivity. One method involves the use of two conduct pipes (steel pipes or stainless steel pipes) having each an electrode part on the end thereof which are buried at an interval of about 30-200 m. Accordingly, the electrode part is situated on the oil sand layer, and an electric potential of several hundred volts to several ten thousand volts is applied to both electrodes. This causes the temperature of the oil sand layer to rise due to joule's heat which reduces the viscosity of the oils.

The specific resistance of the oil sand layer is several times higher than that of the upper strata. Accordingly, it is necessary for the conduct pipes to be covered with an electrically insulating material over the portion which is buried in the strata so that the electric current does not flow through the upper strata. If the conduct pipes are not covered with an electrically insulating material, the electric current does not flow between electrodes buried in the oil sand layer, because it flows through the stratum part. Accordingly, there has been a significant need to develop conduct pipes covered with an electrically insulating material which are cappable of being used under such specific conditions.

Characteristics required for this electrical insulating material include (A) the ability to withstand a voltage of several hundred volts–several ten hundred volts and a volume resistivity of at least $10^6 \Omega$-cm at not only a normal temperature but also at a temperature capable of reducing the viscosity of oils in the oil sand layer (about 300° C.), (B) the ability to withstand hot water (about 300° C.), because water contained in the oil sand layer is heated to a temperature capable of reducing the viscosity of the oil sand layer (about 300° C.), and (C) it has mechanical strength capable of hanging the electrode and mechanical impact strength of such a degree that it is not broken by contacting wall of the pit when burying the electrode hanging on the end of the conduct pipe in the oil sand layer.

SUMMARY OF THE INVENTION

The present inventors carried out earnest studies in order to develop conduct pipes covered with an electrically insulating material having all the characteristics (A)–(C) described above. As a result of those studies they have found that a conduct pipe covered with an electrical insulating material having all characteristics of the above described (A)–(C) can be obtained by forming a resin coating film on the surface of a conduct pipe. The film is formed by means of a fusion pressure method at a temperature of about 350°–450° C. using a powdery, tubular or filmy polyether ether ketone resin.

The present invention relates to a conduct pipe covered with an electrically insulating material and particularly, to one useful in an electrode apparatus for electrically heating underground hydrocarbon resources. The invention is obtained by attaching a powdery, tubular or filmy polyether ether ketone resin to the outside of a metal conduct pipe using pressure with fusing at a temperature of 350°–450° C.

DETAILED DESCRIPTION OF THE INVENTION

Polyether ether ketone resin in the present invention is represented, for example, by the following chemical formula, specific example include aromatic polyether ether ketones developed by Imperial Chemical Industries, Ltd.

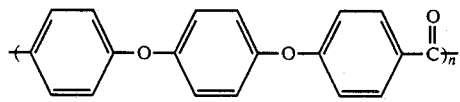

The polyether ether ketone resin used may be in the form of a powder, tube or film. It is applied to the outside of a metal pipe by coating, sticking, electrostatic coating, flame spraying, fluidized-bed coating, fitting, shrink fittings or winding, etc. Thereafter it is attached to the outer surface of the pipe using pressure with fusing at about 350°–450° C. under a mechanical pressure of 30–1000 g/cm² to form the desired electrical insulating coating.

An example of a useful metal conduct pipe is a steel pipe; and stainless steel pipes having excellent corrosion resistance and good electric conductivity are preferably used. Although the length of the conduct pipe depends upon the depth of the oil sand layer under the ground, a length of about 200–600 m or so is generally required.

In the following, embodiments of the conduct pipe covered with the electrical insulating material of the present invention are illustrated.

Figure 1:
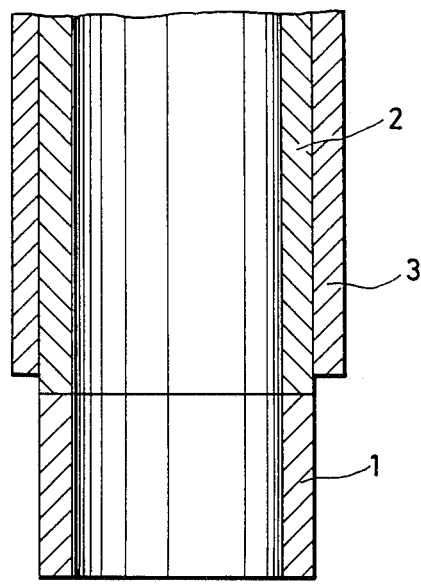
FIG. 1 is a partial sectional view of the end part of a conduct pipe covered with an electrical insulating material using a polyether ether ketone resin.

FIG. 1 is a partial sectional view of an end part of the conduct pipe covered with the electrically insulating material. As shown in FIG. 1, the outside of a metal conduct pipe (2) connecting with an electrode (1) is covered with a polyether ether ketone resin.

Generally, the conduct pipe (2) must have a length of about 200-600 m. Accordingly, since the steel pipes or the stainless steel pipes generally each has a length of 5-50 m, they are connected together when inserting the end part of the conduct pipe into the oil sand layer.

Figure 2:
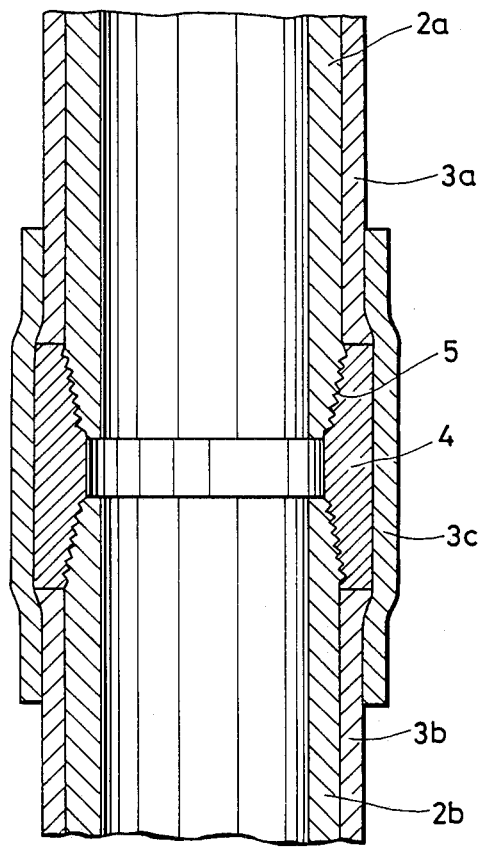
FIG. 2 is a partial sectional view of a junction part of a conduct pipe covered with an electrically insulating material using a polyether ether ketone resin. (2), (2a) and (2b): Conduct pipe (3), (3a), (3b) and (3c): Electrical insulating layer

FIG. 2 is a partial sectional view of the conjunction part of the conduct pipe covered with the electrically insulating material. As shown in FIG. 2, when connecting a conduct pipe (2a) covered with the electrical insulating material (3a) to a conduct pipe (2b) covered with the electrical insulating material (3b), the end parts of the conduct pipes (2a) and (2b) are processed so as to have a taper screw (5) to connect each pipe by means of a coupling (4). In this case, the conjunction part, namely, the surface of the coupling (4), and the end parts of the conduct pipes are covered with an electrical insulating material (3c). This prevents leakage of electricity from the conjunction part.

While the invention has been described with reference to a conduct pipe covered with an electrically insulating material useful in an electrode apparatus for collecting underground hydrocarbon resources, it is not to be construed that the invention is limited thereto. In other words, the conduct pipe of the present invention can also be used as a pipe for oil pipeline, a conduit of chemical plant, etc.

In the following, the method of covering with the insulating layer (3), (3a), (3b) or (3c) of the polyether ether ketone resin and properties of the insulating layer are illustrated in detail with reference to Examples and Comparative Example, but the present invention is not limited to these examples.

EXAMPLE 1

A tape of polyether ether ketone resin film having a thickness of 0.05 mm and a width of 30 mm was wound round a conduct pipe 20 times. Each wrapping overlapped the one below by half width of the tape. The film obtained had a thickness of 2 mm on the outside of the conduct pipe. The outermost layer of the film wound on the conduct pipe was pressed by means of an iron plate under a pressure of 100 g/cm² while revolving the conduct pipe in an electric furnace at 380° C. to form an insulating layer of the polyether ether ketone resin on the conduct pipe.

Tensile strength (kg/cm²) at 25° C. and dielectric breakdown voltage (kV/mm) of the resulting insulating layer and those of the insulating layer after dipping in hot water at 300° C. for 500 hours are shown in Table 1.

COMPARATIVE EXAMPLE 1

An experiment was carried out by the same procedure as in Example 1, except that polytetrafluoroethylene resin was used instead of the polyether ether ketone resin. Characteristics of the resulting insulating layer are shown in Table 1.

TABLE 1

| | Initial Value | | After hot water treatment | |
|---|---|---|---|---|
| | Tensile strength (Kg/cm²) | Dielectric breakdown voltage (kV/mm) | Tensile strength (Kg/cm²) | Dielectric breakdown voltage (kV/mm) |
| Example 1 | 1050 | 35 | 970 | 32 |
| Comparative Example 1 | 75 | 30 | 10 | 8 |

It can be understood from Table 1 that the conduct pipe covered with the insulating layer which is obtained by attaching a polyether ether ketone resin using pressure with fusing at 380° C. has excellent mechanical and electrical characteristics. These characteristics are hardly deteriorated after the hot water treatment.

EXAMPLE 2

A conduct pipe heated to 360° C. was immersed in a polyether ether ketone resin powder having a particle size adjusted to 150-250 microns by a fluidized-bed coating process to form a powder layer having a thickness of 1 mm on the conduct pipe. Then, the powder attached to the conduct pipe was pressed by means of an iron plate under a pressure of 50 g/cm² while revolving the conduct pipe in an electric furnace at 400° C. to form an insulating layer of the polyether ether ketone resin on the conduct pipe. Characteristics of the resulting insulating layer were similar to those of the insulating layer obtained in Example 1.

As described above, the conduct pipe covered with an electrical insulating material of the present invention has an insulating layer which is excellent in electrical properties, mechanical properties and hot water resistance. Accordingly, it is suitable as a conduct pipe for collecting underground hydrocarbon resources by an electrically heating method.

While the invention has been described in detail and with reference to the specific embodiments thereof, it will be apparent to one skilled in the art that various changes and modifications can be made therein without departing from the spirit and scope thereof.

What is claimed is:

1. A hot water resistant conduct pipe useful in an electrode apparatus for collecting underground hydrocarbon resources by an electrically heating method, produced by the process comprising:
   (1) producing a metal conduct pipe; and
   (2) attaching a polyether ether ketone resin to the outside surface of the metal conduct pipe by means of pressure of 30-1000 g/cm² with fusing at a temperature of 350°-400° C., wherein said polyether ether ketone resin is in the form of a powder, a tube or a film, wherein said conduct pipe has an electrode on an end thereof and wherein said electrically heating method is conducted by applying a high electrical potential to both electrodes attached to a pair of said conduct pipes situated on an oil sand layer.

* * * * *